United States Patent Office 3,576,912
Patented Apr. 27, 1971

3,576,912
HALOGENATED AND QUATERNIZED BLOCK
POLYMERS
De Loss E. Winkler, Orinda, Calif., assignor to
Shell Oil Company, New York, N.Y.
No Drawing. Filed Sept. 26, 1968, Ser. No. 763,025
Int. Cl. C08f 15/04
U.S. Cl. 260—880
6 Claims

ABSTRACT OF THE DISCLOSURE

Block copolymers having a high water absorption capacity, especially useful as water purification membranes comprise selectively halogenated and quaternized block polymers (and their hydrogenated counterparts) of monovinyl arenes and conjugated dienes wherein substantially all of the halogenation or quaternization has occurred in the diene block.

---

This invention is concerned with novel selectively halogenated and/or quaternized block copolymers. More particularly, it is directed to the preparation of polymers having exceptionally high tensile strength and other elastomeric properties especially suitable for use in water desalinization and allied processes.

The derivatization of unsaturated polymers has been carried out in many aspects. For example, fire resistant polymers have been prepared by halogenation but it has been found that when halogenation is carried to an effective fire resistant extent the polymer is either seriously degraded insofar as molecular weight is concerned or has assumed other physical properties which make it undesirable for commercial use. A certain degree of selectivity has been obtained in the halogenation of butyl rubber which usually contains a minor amount of conjugated diene linkage since halogenation is believed to occur at these unsaturated linkages rather than at saturated bonds. However, the products obtained by this method and on this product still require vulcanization which is not only of economic disadvantage but also entails the presence of undesirable by-products such as the by-products of sulfur-containing vulcanizing recipe components. These by-products become important when the product is to be used for purposes where they come in human contact. It would be highly desirable to be able to prepare a polymer which retains a substantial amount of its original tensile strength and other elastomeric physical properties but which at the same time has been derivatized to an extent sufficient to be effective for either fire proofing, ion exchange, or water desalinization purposes.

It is an object of the present invention to provide novel halogenated block copolymers. It is a particular object of the invention to provide a novel group of selectively halogenated block copolymers. It is a particular object of the invention to provide quaternized derivatives of such materials. Other objects will become apparent during the following detailed description of the invention.

Now, in accordance with the present invention, block copolymers are provided which are selectively halogenated and/or quaternized in the conjugated diene polymer block but wherein the thermoplastic terminal blocks are substantially unaffected so that the tensile strength and other physical properies of the original polymer are retained to a surprising degree. Moreover, in accordance with the present invention it has been found possible to convert these original and novel halogenated block polymers into quaternized derivatives thereof so as to provide high tensile strength essentially elastic thermoplastic polymers capable of ion exchange and also and more particularly capable of being utilized in the desalinization or purification of aqueous liquids and particularly of brackish water or sea water and the like. Still in accordance with the present invention, the most effective group of such halogenated polymers contain from about 2-12% by weight of bromine substituents or a corresponding and relative percentage by weight of other halogens depending on the molecular weight of the halogen relative to that of bromine. Also in accordance with the present invention the most effective quaternized materials comprise those containing between about 0.1 and 2% by weight of a quaternized nitrogen or other quaternary substituents.

The selective derivatization of the originally elastomeric block to the virtual exclusion of derivatizing the thermoplastic blocks of the subject class of block copolymers results in a surprising degree of retention of the original elastomeric properties of these polymers without resorting to any disadvantageous or cumbersome vulcanizing procedures. The block copolymers which are particularly contemplated for starting materials in this product have the general configuration A—B(B—A)$_n$ wherein the blocks A comprise either monovinyl arene polymer blocks or their hydrogenated counterparts while the blocks B comprise either halogenated or quaternized conjugated diene polymer blocks or their hydrogenated counterparts. The substituent $n$ represents an integer from 1 through 5 and normally will be an integer between 1 and 3. The polymers may be either linear, branched, or have a nonlinear configuration generally referred to as "star shaped" which may include cruciform polymers and the like. The simplest form of these polymers has the three-block structure A—B—A. Prior to treatment according to the present invention, the blocks A comprise monovinyl arene polymer blocks such as polystyrene blocks while the block B comprises a conjugated diene polymer back such as polybutadiene or polyisoprene. Hence the simplest species of this structure are polystyrene-polyisoprene-polystyrene and polystyrene-polybutadiene-polystyrene. Since these block copolymers may be prepared by either sequential processes or by coupling processes, the possibility arises that non-linear block polymer configurations may be found. The preparation of these basic polymers does not comprise an aspect of the present invention but is disclosed in earlier publications.

The individual block molecular weights of the polymers being considered here are designed to impart high tensile strength to the entire block polymer while at the same time retaining their inherent elastomeric character. When the proper relationship of the individual block molecular weights is achieved, there is no necessity for vulcanization of these polymers to attain their satisfactory elastomeric physical state. Thus the thermoplastic blocks A preferably have average molecular weights which vary between about 5,000 and 75,000 while the conjugated diene polymer blocks B have individual molecular weights varying from about 20,000 to about 100,000. Preferably, the blocks A comprise between about 15 and 60% by weight of the block copolymer prior to either halogenating or quaternizing.

The products of the present invention are prepared by careful halogenation in its initial stage utilizing only selected classes of halogenating agents. The most effective for this purpose comprise N-haloimides of which the most typical species include N-bromosuccinimide and N-chlorosuccinimide. Other effective agents for this purpose include chloroanilides, chloroamines, and N-monohalohydantoins such as 1,3-dibromo-5,5-dimethylhydantoin. While bromohalogenating agents are especially preferred, the corresponding chlorinated halogenating agents also are suitable. Care must be taken during the halogenation stage to avoid, insofar as possible, degradation of the polymer molecule which otherwise may occur. When utilizing the imides, for example, it is preferred that the halogenation be carried out at temperatures between about 0 and 30° C., preferably between about 15 and 25° C. for a time necessary to cause the desired amount of halogenation. This will normally be between about 8 and about 24 hours when the halogenation is carried out in a relatively inert solvent for the block copolymer such as an alkane or aromatic solvent or mixture thereof including isopentanes, benzene, cyclohexane and the like. The halogenation which is designed to occur by this reaction preferentially takes place in the allyl positions within the conjugated diolefin polymer block while essentially no reaction occurs in the monovinyl arene polymer blocks or their hydrogenated counterparts. Thus the original physical properties of the block copolymer are largely maintained.

When reference is made hereinafter to onium derivatives this will usually be in more specific reference to ammonium salts. However, it will be understood that a corresponding series of compounds may be formed utilizing phosphonium, arsonium, or stibonium reactants in place of the ammonium materials more particularly referred to.

Following halogenation of the block copolymers under conditions whereby the conjugated diene polymer blocks are substantially exclusively halogenated, the halogenated products may be converted to any desirable second species and particularly to the onium species, more particularly the ammonium salts. The ammonium salt is preferably formed by treatment of the halogenated block polymer in its halogenating solvent by addition of a tertiary amine and reaction under mild conditions varying between about 20 and 75° C. for periods of reaction between about 10 minutes and 24 hours. Trialkylamines are especially useful for this purpose but heterocyclic amines of the pyridine series, for example, may be utilized in place of or in addition to the trialkylamines. Suitable trialkylamine substituents include methyl, ethyl, propyl, butyl, and amyl alkyl radicals thus forming such typical amines as trimethylamine, triethylamine, triisopropylamine, tri-(secondary butylamine), dimethylbutylamine and diethylpropylamine.

The striking aspect of the present invention insofar as the onium derivatives are concerned is their surprisingly high ability to absorb water. In so doing the other aspect noted has been that they retain a substantial amount of their tensile strength and other rheological properties in spite of the presence of any absorbed water and thus their industrial utility for many purposes is clearly indicated. Hence one of the most important potential uses of the onium salt derivatives of these block polymers is in water purification processes wherein the onium derived polymer may be formed as a semi-permeable membrane and due to the high sensitivity to water will permit water to pass therethrough while blocking the passage of dissolved salts such as sodium chloride and the like.

The working examples given hereinafter contain data showing the high degree of water absorption of which a number of typical species of these onium derivatives are capable. For some purposes it may be useful to blend the halogenated or onium salt derivatives of the block copolymers with other polymers and particularly with unmodified block copolymers such as those utilized in forming the halogenated or onium salt derivatives. Furthermore, they may be employed as polar containing elastomeric high impact components in either polyolefins or more particularly in polystyrene and the like and may be incorporated therein either by physical blending or by interpolymerization either as the sole high impact component or in combination with other well-known rubbers such as polybutadienes, styrene-butadiene random copolymers, or with the block copolymers described as starting materials for the formation of the halogenated or onium salt derivatives concerned here. Furthermore, due to their compatibility with the block copolymer starting materials it is possible not only to physically blend the halogenated or quaternary salt derivatives therewith but also to effect lamination between surfaces comprising the unmodified block copolymer and the halogenated or quaternized derivatives thereof. Thus laminates may be prepared for use in osmosis dialysis or water purification and water desalinization having still higher impact strength and shock resistance as well as elastomeric properties comprising a perforated sheet of the unmodified block copolymer laminated to a complete sheet of the quaterized derivative thereof. The perforated sheet thus allows a substantial area of the quaternized sheet to be completely available for performing its function as a semi-permeable membrane. On the other hand, the quaternized block copolymer material in sheet form may be supported, for example, on a center glass area or other support if so desired. The halogenated block copolymers may be utilized in elastomeric or thermoplastic compositions as well as in roofing compounds for the purpose of imparting flame retardant properties thereto. The quaternized materials may be used in any desired physical form as ion exchange agents if so desired. In this instance they may be used in granule, chip, film, or solution when performing their ion exchange function.

The following example illustrates the preparation and pertienent properties of the polymer derivatives within this invention.

EXAMPLE I

Two block copolymers were utilized in these typical experiments. The first of these had a structure polystyrene-polybutadiene-polystyrene wherein the block molecular weights were 9500–52,000–9500. The second block copolymer was polystyrene-polyisoprene-polystyrene having block molecular weights of 10,000–140,000–10,000. Benzene solutions of these two polymers were prepared containing about 3% by weight of the polymer. Bromination was effected by room temperature reaction between the block copolymer in solution with N-bromosuccinimide, utilizing a proportion of 80 grams of the imide per 100 grams of the block copolymer. Reaction was continued for a varying length of time between about 24 hours and 72 hours to obtain varying degrees of bromination. The polymers are believed to be selectively brominated in the conjugated diene center block with virtually no alternation of the polystyrene end blocks. The polymers were found to have the following bromine contents.

TABLE I

| Polymer | Percent (weight) bromine |
|---|---|
| Sample: | |
| A .......... S-B-S | 11.5 |
| B .......... S-I-S | 13.2 |
| C .......... S-I-S | 13.2 |
| D .......... S-B-S | 14.9 |

The brominated samples were then converted to the ammonium salts by reaction with either triethylamine or with pyridine as shown in Table II.

TABLE II

| | Percent (wt.) N | Amine | Water absorption, percent (wt.) | | | |
|---|---|---|---|---|---|---|
| | | | 1 day | 2 days | 12 days | 27 days |
| Sample: | | | | | | |
| AA | 0.20 | Triethylamine | | | 105 | 215 |
| BB | 0.35 | do | | | 90 | 190 |
| CC | 0.59 | do | | 40 | 170 | 380 |
| DD | 1.78 | Pyridine | 225 | 265 | | |

Reaction was carried out at about 50° C. for several hours. Twenty mil sheets of the ammonium salts so derived were prepared and tested for their water absorption capability, the results of which are given in Table II and indicated the high capability of absorbing water. Thus indicating their potential suitability in water desalinization or water purification processes. It is especially striking that all of the samples thus tested retain a substantial amount of their tensile strength and other elastomeric properties.

The following data are indicative of the values obtained:

| Sample | DD | D |
|---|---|---|
| Pounds tensile strength | 3,080 | 5,000 |
| Percent elongation at break | 210 | 990 |
| Percent set at break | 15 | 20 |

I claim as my invention:

1. An elastomeric halogenated block copolymer having the general configuration $$A-B-(-B-A)_n$$

wherein each A is a thermoplastic polymer block of the group consisting of poly(monovinyl arene) and hydrogenated derivatives thereof, the total weight of the A blocks is from about 15% to about 60% by weight of the block copolymer, B is a halogenated polymer block of the group consisting of conjugated diene and hydrogenated derivatives thereof, the halogen content of the block copolymer being between about 2 and about 12 weight percent, and $n$ is an integer from 1 to 5.

2. A quaternary amine salt of the halogenated block polymer according to claim 1 and a trialkyl amine.

3. A quaternary amine salt of the halogenated block copolymer according to claim 1 and a tertiary heterocyclic amine.

4. A brominated block copolymer according to claim 1 wherein the blocks A are polystyrene blocks and the blocks B are brominated polybutadiene blocks, the bromine content of the block copolymer being between about 3 and 10 weight percent.

5. A quaternary amine salt of the brominated block copolymer according to claim 2 with pyridine.

6. A quaternary amine salt of the brominated block copolymer according to claim 2 with triethyl amine.

References Cited

UNITED STATES PATENTS

| 2,597,440 | 5/1952 | Bodamer | 260—94.7 |
| 3,293,226 | 12/1966 | De Schrijver | 260—879 |
| 3,397,174 | 8/1968 | Parker et al. | 260—94.7 |
| 3,452,118 | 6/1969 | Winkler et al. | 260—879 |
| 3,506,741 | 4/1970 | Trepka et al. | 260—880 |

JAMES A. SEIDLECK, Primary Examiner

U.S. Cl. X.R.

210—59; 260—94.7, 879